United States Patent
Hsing et al.

(10) Patent No.: US 11,095,229 B1
(45) Date of Patent: Aug. 17, 2021

(54) HIGH SWITCHING FREQUENCY DIRECT AC TO AC CONVERTER

(71) Applicant: Monolithic Power Systems, Inc., San Jose, CA (US)

(72) Inventors: Michael Hsing, Saratoga, CA (US); Eric Yang, Saratoga, CA (US); Jian Jiang, Saratoga, CA (US); Di Han, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 17/030,698

(22) Filed: Sep. 24, 2020

(51) Int. Cl.
| | |
|---|---|
| H02M 5/22 | (2006.01) |
| H02M 5/458 | (2006.01) |
| H02M 7/5395 | (2006.01) |
| H02M 1/08 | (2006.01) |
| H02M 5/293 | (2006.01) |

(52) U.S. Cl.
CPC .............. H02M 5/225 (2013.01); H02M 1/08 (2013.01); H02M 5/293 (2013.01); H02M 5/458 (2013.01); H02M 7/5395 (2013.01)

(58) Field of Classification Search
CPC ........... H02M 1/08–096; H02M 5/225; H02M 5/293–297; H02M 5/458; H02M 7/5395
See application file for complete search history.

(56) References Cited

U.S. PATENT DOCUMENTS

| | | | | |
|---|---|---|---|---|
| 8,427,113 | B2* | 4/2013 | Xing | H02M 3/07 320/145 |
| 9,413,221 | B1* | 8/2016 | Kim | H02M 7/217 |
| 9,490,720 | B1* | 11/2016 | Kim | H02M 5/225 |
| 9,853,460 | B2* | 12/2017 | Ichikawa | H02M 3/33584 |
| 10,601,302 | B1* | 3/2020 | Sharma | H03K 17/08122 |
| 10,811,959 | B1* | 10/2020 | Shao | H02M 3/07 |
| 2005/0110556 | A1* | 5/2005 | Guedon | H03F 3/217 327/390 |
| 2005/0168206 | A1* | 8/2005 | Nadd | H03F 3/2171 323/285 |
| 2009/0153113 | A1* | 6/2009 | Zilberberg | H02P 27/00 323/282 |
| 2014/0043875 | A1* | 2/2014 | Hsing | G05F 1/56 363/77 |
| 2015/0061611 | A1* | 3/2015 | Li | H03K 17/063 323/235 |
| 2015/0318788 | A1* | 11/2015 | Kovacic | H02M 7/487 363/21.01 |
| 2016/0043642 | A1* | 2/2016 | Xu | H02M 1/08 323/271 |
| 2017/0047841 | A1* | 2/2017 | Zojer | H02M 7/219 |

(Continued)

*Primary Examiner* — Yusef A Ahmed
(74) *Attorney, Agent, or Firm* — Perkins Coie LLP (57) ABSTRACT

A direct AC to AC converter includes a modulation stage, a transformer and a de-modulation stage. The modulation stage is configured to convert an AC input voltage with a first frequency into a bipolar PWM voltage with a second frequency, wherein the second frequency is higher than the first frequency. The transformer has a primary winding and secondary winding, wherein the primary winding is coupled to the modulation stage to receive the bipolar PWM voltage. The de-modulation stage is coupled to the secondary winding of the transformer and configured to convert the voltage across the secondary winding of the transformer into an AC output voltage with the first frequency.

15 Claims, 8 Drawing Sheets

(56) References Cited

U.S. PATENT DOCUMENTS

| | | | | |
|---|---|---|---|---|
| 2018/0337610 A1* | 11/2018 | Leong | ............... | H02M 3/33523 |
| 2019/0028094 A1* | 1/2019 | Reusch | ............... | H03K 17/063 |
| 2019/0238129 A1* | 8/2019 | Fukushima | .......... | H03K 17/163 |
| 2020/0153338 A1* | 5/2020 | Ribarich | ................. | H02M 1/08 |
| 2020/0295663 A1* | 9/2020 | Yelaverthi | ............... | H02M 1/44 |
| 2020/0395840 A1* | 12/2020 | Goetz | ................ | H02M 7/4835 |
| 2021/0029794 A1* | 1/2021 | Weiss | ..................... | H05B 45/44 |
| 2021/0050779 A1* | 2/2021 | Deng | ..................... | H02M 1/08 |
| 2021/0091655 A1* | 3/2021 | Hegde | ................ | H02M 7/5387 |
| 2021/0100082 A1* | 4/2021 | Aoki | .................... | H05B 45/375 |
| 2021/0194357 A1* | 6/2021 | Zhang | .................... | H02M 3/07 |

* cited by examiner

FIG. 1

(PRIOR ART)

HIGH SWITCHING FREQUENCY DIRECT AC TO AC CONVERTER

TECHNICAL FIELD

The present invention generally relates to electronic circuits, and more particularly but not exclusively, to AC to AC converters.

BACKGROUND

To transform AC (alternating current) line voltage between different voltage levels with an isolation barrier, there are two commonly adopted solutions. One is to use an AC line transformer. However, with a 50~60 Hz AC line frequency, these transformers are extremely bulky and expensive.

Figure 1:
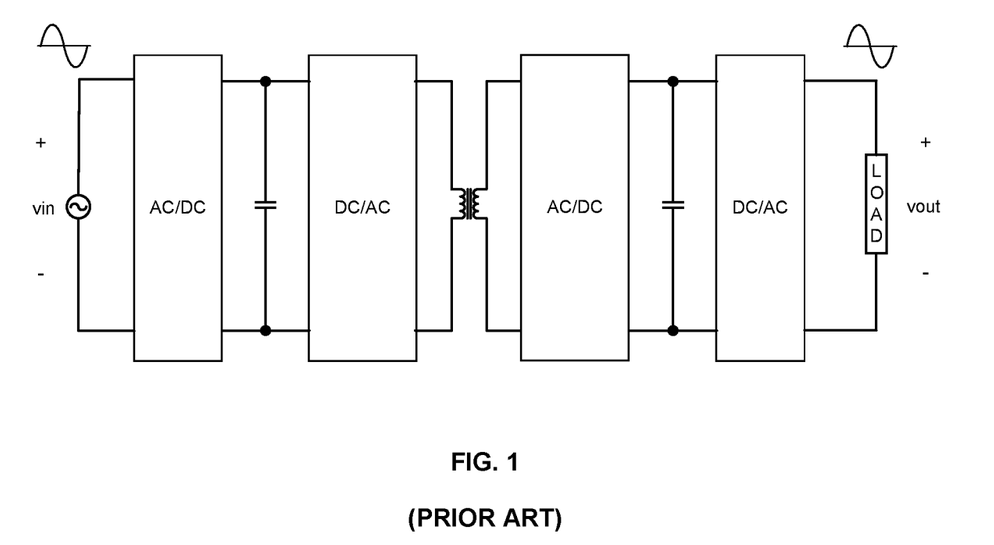
FIG. 1 is a block diagram of a prior art DC-link based AC to AC converter.

Another solution is using DC-link based AC to AC converters, such as shown in FIG. 1. In this topology, two large capacitors are needed to maintain stable DC bus voltages, which inevitably increase the size and cost of the converter.

Therefore, what is needed is an AC to AC converter with reduced size and lower cost.

SUMMARY

Embodiments of the present invention are directed to a direct AC to AC converter comprising a modulation stage, a transformer and a de-modulation stage. The modulation stage is configured to convert an AC input voltage with a first frequency into a bipolar PWM voltage with a second frequency, wherein the second frequency is higher than the first frequency. The transformer has a primary winding and secondary winding, wherein the primary winding is coupled to the modulation stage to receive the bipolar PWM voltage. The de-modulation stage is coupled to the secondary winding of the transformer and configured to convert the voltage across the secondary winding of the transformer into an AC output voltage with the first frequency.

Embodiments of the present invention are also directed to a direct AC to AC conversion method comprising: converting an AC input voltage with a first frequency into a bipolar PWM voltage with a second frequency through a modulation stage, wherein the second frequency is higher than the first frequency; providing the bipolar PWM voltage to a primary winding of a transformer; and converting the voltage across the secondary winding of the transformer into an AC output voltage with the first frequency through a de-modulation stage.

Embodiments of the present invention are further directed to a control IC used in a direct AC to AC converter, wherein the direct AC to AC converter is configured to convert an AC input voltage of a first frequency into an AC output voltage of the first frequency, and comprises a first transistor, a second transistor, a third transistor and a fourth transistor. Each of the transistors have a first terminal, a second terminal and a control terminal, the first terminal of the second transistor is coupled to first terminal of the first transistor, the first terminal of the fourth transistor is coupled to the first terminal of the third transistor, the second terminal of the fourth transistor is coupled to the second terminal of the first transistor. When the AC input voltage is in a first half cycle, the control IC maintains the second and fourth transistors on, and switches the first and third transistors at a second frequency higher than the first frequency. When the AC input voltage is in a second half cycle, the control IC maintains the first and third transistors on, and switches the second and fourth transistors at the second frequency.

Embodiments of the present invention are still further directed to a control IC used in a direct AC to AC converter, wherein the direct AC to AC converter is configured to convert an AC input voltage into an AC output voltage, and comprises a first transistor, a second transistor, a third transistor and a fourth transistor. Each transistor has a first terminal, a second terminal and a control terminal. The control IC comprises: a first pin configured to be coupled to the control terminal of the second transistor; a second pin configured to be coupled to a first terminal of a first bootstrap capacitor; a third pin configured to be coupled to the control terminal of the first transistor; a fourth pin configured to be coupled to the second terminals of the first and fourth transistors, and a second terminal of the first bootstrap capacitor; a fifth pin configured to be coupled to the control terminal of the fourth transistor; a sixth pin configured to be coupled to the control terminal of the third transistor; a seventh pin configured to be coupled to the second terminal of the second transistor and a second terminal of a second bootstrap capacitor; an eighth pin configured to be coupled to a first terminal of the second bootstrap capacitor; a ninth pin configured to receive a power supply voltage; a tenth pin configured to be coupled to a reference ground; an eleventh pin configured to be coupled to a first terminal of a third bootstrap capacitor; a twelfth pin configured to be coupled to the second terminal of the third transistor and a second terminal of the third bootstrap capacitor; a control circuit configured to generate a first control signal, a second control signal, a third control signal and a fourth control signal; a low dropout regulator having an input terminal and an output terminal, wherein the input terminal is coupled to the ninth pin to receive the power supply voltage; a first diode having an anode and a cathode, wherein the anode is coupled to the output terminal of the low dropout regulator; a first driving circuit having a first supply terminal, a second supply terminal, an input terminal and an output terminal, wherein the first supply terminal is coupled to the cathode of the first diode, the second supply terminal is coupled to the fourth pin, the input terminal is coupled to the control circuit to receive the first control signal, the output terminal is coupled to the third pin; a second diode having an anode and a cathode, wherein the anode is coupled to the output terminal of the low dropout regulator; a second driving circuit having a first supply terminal, a second supply terminal, an input terminal and an output terminal, wherein the first supply terminal is coupled to the cathode of the second diode, the second supply terminal is coupled to the seventh pin, the input terminal is coupled to the control circuit to receive the second control signal, the output terminal is coupled to the first pin; a third diode having an anode and a cathode, wherein the anode is coupled to the output terminal of the low dropout regulator; a third driving circuit having a first supply terminal, a second supply terminal, an input terminal and an output terminal, wherein the first supply terminal is coupled to the cathode of the third diode, the second supply terminal is coupled to the twelfth pin, the input terminal is coupled to the control circuit to receive the third control signal, the output terminal is coupled to the sixth pin; and a fourth driving circuit having a first supply terminal, a second supply terminal, an input terminal and an output terminal, wherein the first supply terminal is coupled to the cathode of the first diode, the second supply terminal is coupled to the fourth pin, the input terminal is coupled to the control circuit to receive the fourth control signal, the output terminal is coupled to the fifth pin.

Compared with prior arts, the direct AC to AC converters according to embodiments of the present invention avoid the size and cost associated with AC line transformers, and also avoid the bulky capacitors needed in typical DC-link based AC to AC converters.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

As described in the background portion, the prior art AC to AC converters with isolation barrier need bulky and expensive transformers or capacitors. To solve this problem, embodiments of the present invention propose a direct AC to AC converter, which removes the intermediate DC link, and shrinks size and cost of the converter by using high switching frequency operating topology with minimal passive components.

Figure 2:
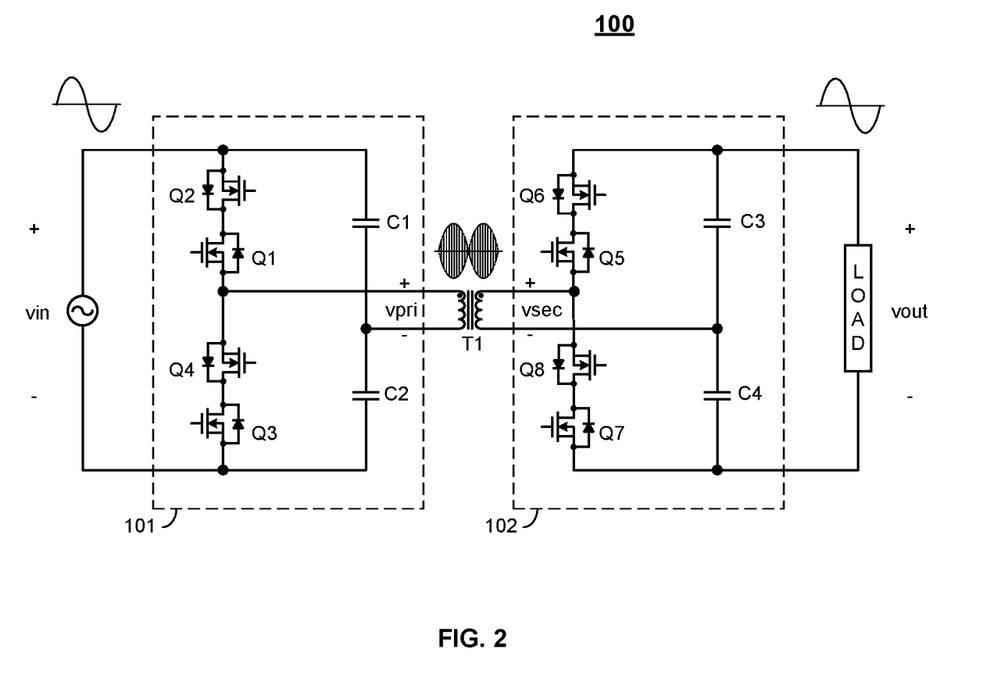
FIG. 2 schematically illustrate a direct AC to AC converter 100, in accordance with an embodiment of the present invention.

FIG. 2 schematically illustrate a direct AC to AC converter 100, in accordance with an embodiment of the present invention. The direct AC to AC converter 100 includes a modulation stage 101, a high frequency transformer T1 and a de-modulation stage 102. The modulation stage 101 is configured to convert an AC input voltage yin with a first frequency (e.g., 50~60 Hz) into a bipolar PWM voltage vpri with a second frequency, wherein the second frequency is higher than the first frequency. The second frequency is normally tens of times of the first frequency, for example, among a range of 1 kHz to 2 MHz. The transformer T1 has a primary winding and secondary winding, wherein the primary winding is coupled to the modulation stage 101 to receive the bipolar PWM voltage vpri. The de-modulation stage 102 is coupled to the secondary winding of the transformer T1, and is configured to convert a voltage vsec across the secondary winding of the transformer T1 into an AC output voltage vout with the first frequency.

In the embodiment shown in FIG. 2, the modulation stage 101 comprises capacitors C1, C2, and two pairs of back-to-back transistors formed by MOSFETs (metal oxide semiconductor field effect transistors) Q1~Q4. The drain terminal of the transistor Q2 is coupled to drain terminal of the transistor Q1 to form one pair of back-to-back transistors, the source terminal of the transistor Q2 is coupled to a first terminal of an AC power source which provides the AC input voltage yin. The source terminal of the transistor Q3 is coupled to a second terminal of the AC power source. The drain terminal of the transistor Q4 is coupled to the drain terminal of the transistor Q3 to form another pair of back-to-back transistors, the source terminal of the transistor Q4 and the source terminal of the transistor Q1 are coupled together and further coupled to a first terminal of the primary winding of the transformer T1. The capacitors C1, C2 normally have the same capacitance, and each has a first terminal and a second terminal. The first terminal of the capacitor C1 is coupled to the source terminal of the transistor Q2. The first terminal of the capacitor C2 and the second terminal of the capacitor C1 are coupled together and further coupled to a second terminal of the primary winding of the transformer T1. The second terminal of the capacitor C2 is coupled to the source terminal of the transistor Q3.

When the AC input voltage yin is positive (e.g., the voltage level at first terminal of the AC power source is higher than the voltage level at the second terminal of the AC power source), the transistors Q2 and Q4 are maintained on, the transistors Q1 and Q3 are switched at the second frequency. When the AC input voltage vin is negative (e.g., the voltage level at first terminal of the AC power source is lower than the voltage level at the second terminal of the AC power source), the transistors Q1 and Q3 are maintained on, the transistors Q2 and Q4 are switched at the second frequency. Generally, the AC input voltage could be sensed and compared with a threshold voltage to determine whether it is positive or negative.

Similarly, the de-modulation stage 102 in the embodiment shown in FIG. 2 comprises capacitors C3, C4, and two pairs of back-to-back transistors formed by MOSFETs Q5~Q8. The drain terminal of the transistor Q6 is coupled to the drain terminal of the transistor Q5, the source terminal of the transistor Q6 is coupled to a first terminal of a load for providing the AC output voltage vout. The source terminal of the transistor Q7 is configured to be coupled to a second terminal of the load. The drain terminal of the transistor Q8 is coupled to the drain terminal of the transistor Q7, the source terminal of the transistor Q8 and the source terminal of the transistor Q5 are coupled together and further coupled to a first terminal of the secondary winding of the transformer T1. The capacitors C3, C4 normally have the same capacitance, and each has a first terminal and a second terminal. The first terminal of the capacitor C3 is coupled to the source terminal of the transistor Q6. The first terminal of the capacitor C4 and the second terminal of the capacitor C3 are coupled together and further coupled to a second terminal of the secondary winding of the transformer T1. The second terminal of the capacitor C4 is coupled to the source terminal of the transistor Q7.

When the AC input voltage vin is positive, the transistors Q6 and Q8 are maintained on, the transistors Q5 and Q7 work as synchronous rectifiers. When the AC input voltage vin is negative, the transistors Q5 and Q7 are maintained on, the transistors Q6 and Q8 work as synchronous rectifiers. When working as a synchronous rectifier, the transistor is switched on and off synchronously with the voltage to be rectified (e.g. the voltage vsec across the secondary winding). For example, when the transistors Q5 and Q7 work as synchronous rectifiers, the transistor Q5 is turned on and the transistor Q7 is turned off when the voltage vsec is positive, the transistor Q5 is turned off and the transistor Q7 is turned on when the voltage vsec is negative.

There are a few ways to determine whether the AC input voltage vin is positive or negative at the secondary side. For example, a separate isolation channel (e.g. opto-coupler) could be used to transmit a relevant information from the primary side to the secondary side. Another possible implementation is to start-up at a default phase (e.g. Q6 and Q8 maintained on, Q5 and Q7 working as synchronous rectifiers), then monitor zero crossings of the AC output voltage vout to determine the instances to swap phase.

Figure 3:
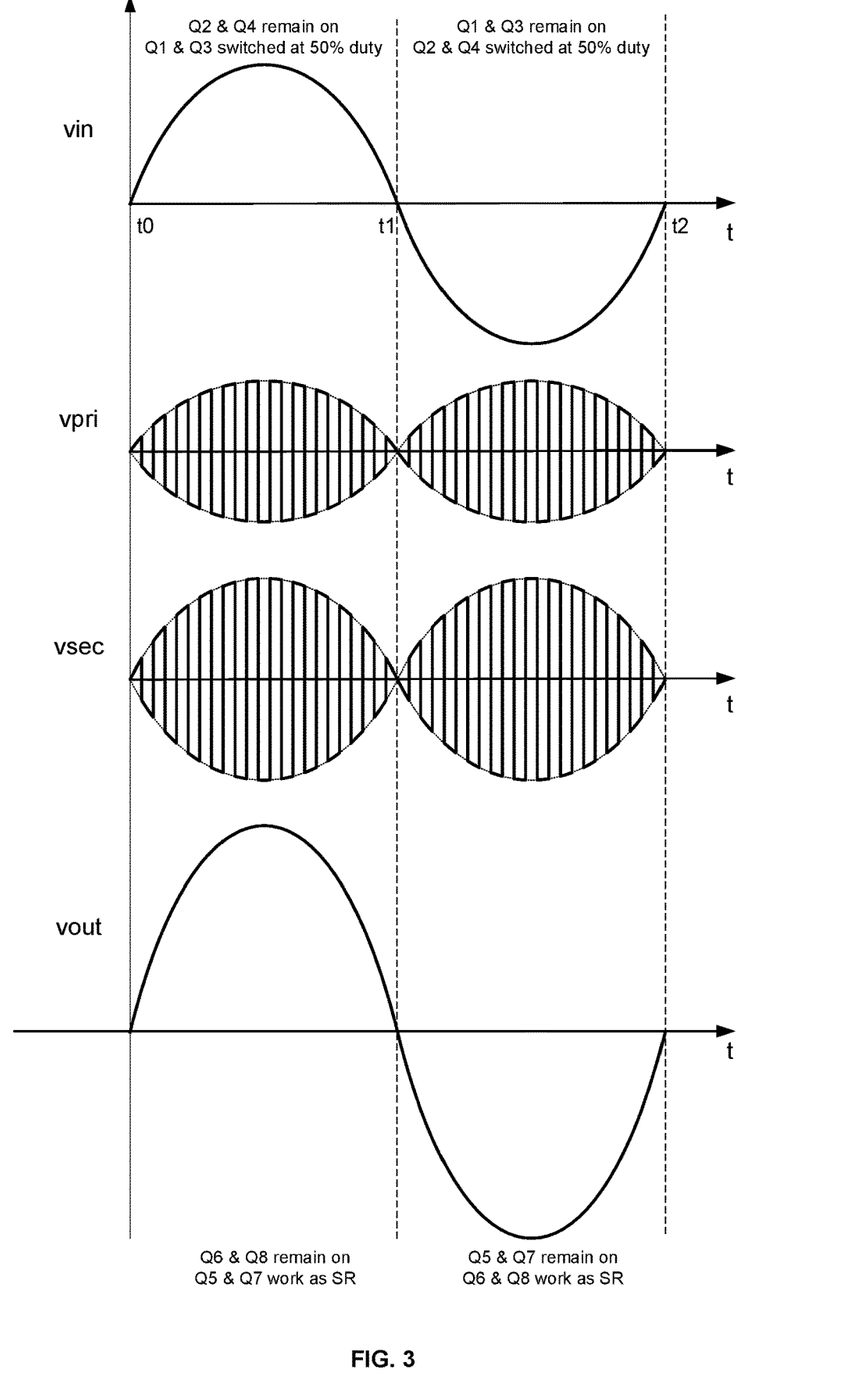
FIG. 3 illustrates waveforms of the direct AC to AC converter 100 shown in FIG. 2, in accordance with an embodiment of the present invention.

The operation principle of the direct AC to AC converter 100 will be further described in conjunction with waveforms shown in FIG. 3. Persons of ordinary skills in the art could recognize, however, that these waveforms and description are only used for illustration, and are not intended to limit the present invention.

FIG. 3 illustrates waveforms of the direct AC to AC converter 100 shown in FIG. 2, in accordance with an embodiment of the present invention. As can be seen from FIG. 3, the AC input voltage vin has a sinusoidal waveform with a positive half cycle and a negative half cycle. During the positive half cycle of yin, the transistors Q2 and Q4 are maintained on, the transistors Q1 and Q3 are switched alternately with a duty cycle of 50%. When the transistor Q1 is on and the transistor Q3 is off, the voltage vpri across the primary winding of the transformer T1 is positive and could be expressed as:

$$vpri = \frac{vin}{2} \qquad (1)$$

When the transistor Q1 is off and the transistor Q3 is on, the voltage vpri across the primary winding of the transformer T1 is negative and could be expressed as:

$$vpri = -\frac{vin}{2} \qquad (2)$$

During the negative half cycle of yin, the transistors Q1 and Q3 are maintained on, the transistors Q2 and Q4 are switched alternately with a duty cycle of 50%. When the transistor Q2 is on and the transistor Q4 is off, the voltage vpri across the primary winding of the transformer T1 is negative and could be expressed as in equation (1). When the transistor Q2 is off and the transistor Q4 is on, the voltage vpri across the primary winding of the transformer T1 is positive and could be expressed as in equation (2). Therefore, the voltage vpri in this embodiment is a bipolar PWM voltage with a duty cycle of 50% and a sinusoidal envelope.

The voltage vsec across the secondary winding of the transformer is proportional to the voltage vpri, and could be expressed as:

$$vsec = vpri * \frac{N2}{N1} \qquad (3)$$

Wherein N2/N1 is the turn ratio of the transformer T1.

During the positive half cycle of yin, the transistors Q6 and Q8 are maintained on, the transistors Q5 and Q7 work as synchronous rectifiers. When the voltage vsec is positive, the transistor Q7 is off, and a current flowing through the secondary winding of the transformer T1, the transistors Q5, Q6, the load and the capacitor C4. When the voltage vsec is negative, the transistors Q5 is off, a current flowing through the capacitor C3, the load, and the transistors Q7, Q8. Therefore, a positive AC output voltage vout is obtained during the positive half cycle of yin, and could be expressed as:

$$vout = 2 * |vsec| \qquad (4)$$

During the negative half cycle of yin, the transistors Q5 and Q7 are maintained on, the transistors Q6 and Q8 work as synchronous rectifiers. When the voltage vsec is positive, the transistor Q6 is off, and a current flowing through the secondary winding of the transformer T1, the transistors Q7, Q8, the load and the capacitor C3. When the voltage vsec is negative, the transistors Q8 is off, a current flowing through the capacitor C4, the load, and the transistors Q5, Q6. Therefore, a negative AC output voltage vout is obtained during the negative half cycle of yin, and could be expressed as:

$$vout = -2 * |vsec| \qquad (5)$$

Combining the equations (1)~(5), it could be obtained that:

$$vout = vin * \frac{N2}{N1} \quad (6)$$

This means, the AC output voltage vout of the direct AC to AC converter 100 shown in FIG. 2 is proportional to the AC input voltage yin, and the proportional coefficient is determined by the turn ratio of the transformer T1.

The direct AC to AC converter 100 avoids the size and cost associated with AC line transformers, and also avoids the bulky capacitors needed in typical DC-link based AC to AC converters.

Figure 4A:
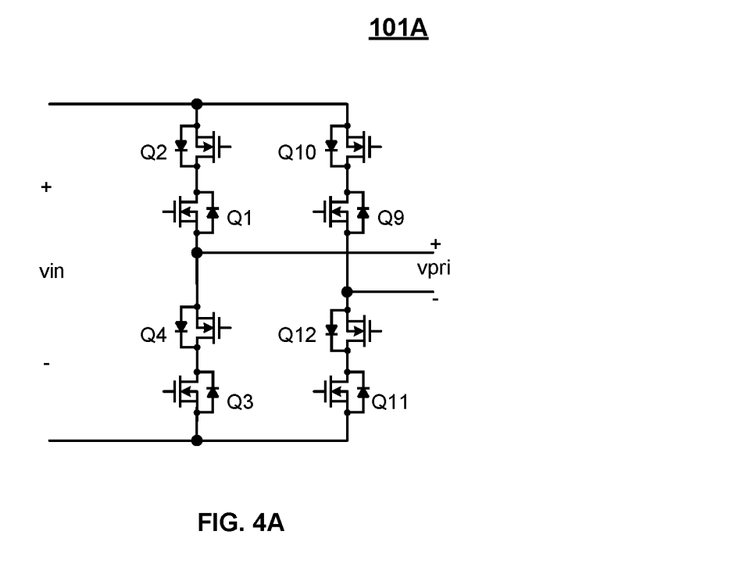
FIG. 4A and FIG. 4B schematically illustrate alternative structures of the modulation stage, in accordance with embodiments of the present invention.
Figure 4B:
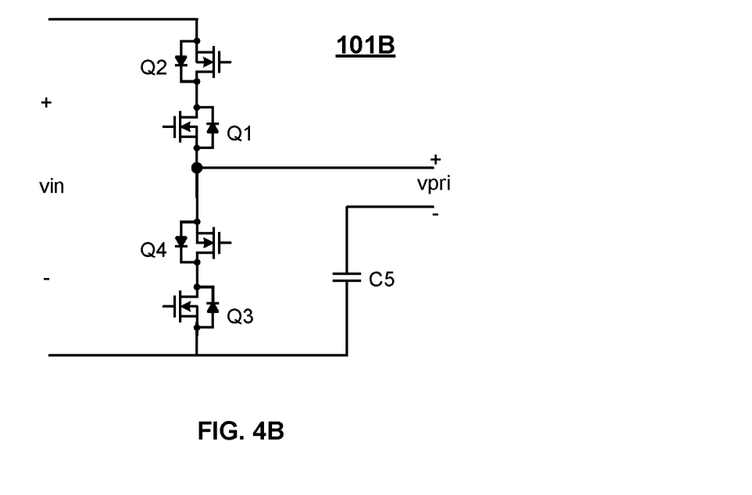
Figure 5A:
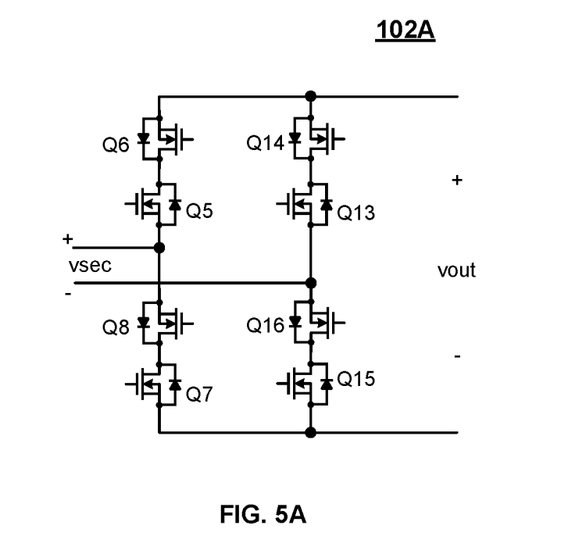
FIG. 5A and FIG. 5B schematically illustrate alternative structures of the de-modulation stage, in accordance with embodiments of the present invention.
Figure 5B:
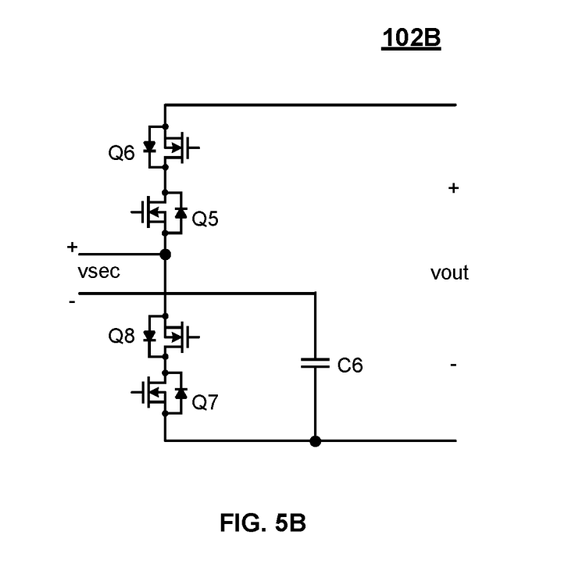

Besides the symmetrical half bridge configuration shown in FIG. 2, the modulation stage and de-modulation stage could also adopt other suitable structures, such as full bridge structures shown in FIG. 4A and FIG. 5A, or asymmetrical half bridge structure shown in FIG. 4B and FIG. 5B. These structures are interchangeable and could be chosen based on practical applications.

Figure 6:
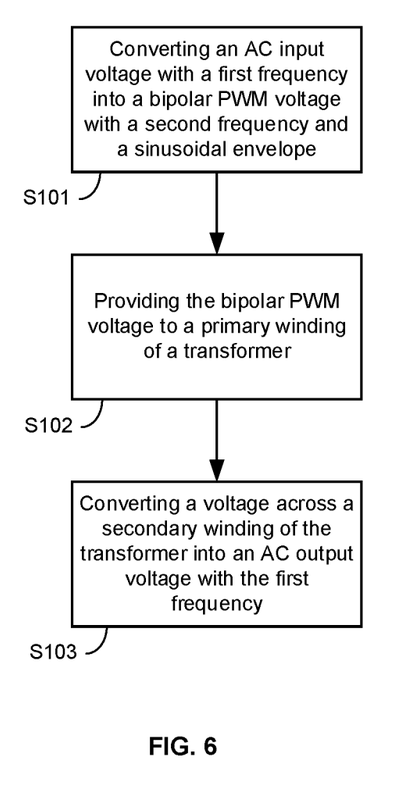
FIG. 6 is a flowchart of a direct AC to AC conversion method, in accordance with an embodiment of the present invention.

FIG. 6 is a flowchart of a direct AC to AC conversion method, in accordance with an embodiment of the present invention. It includes steps S101~S103.

At step S101, an AC input voltage with a first frequency is converted into a bipolar PWM voltage, through a modulation stage such as those shown in FIGS. 2, 4A, and 4B. The bipolar PWM voltage has a second frequency higher than the first frequency and a sinusoidal envelope.

At step S102, the bipolar PWM voltage is provided to a primary winding of a transformer.

At step S103, the voltage across a secondary winding of the transformer is converted into an AC output voltage with the first frequency, through a de-modulation stage such as those shown in FIGS. 2, 5A, and 5B.

Figure 7:
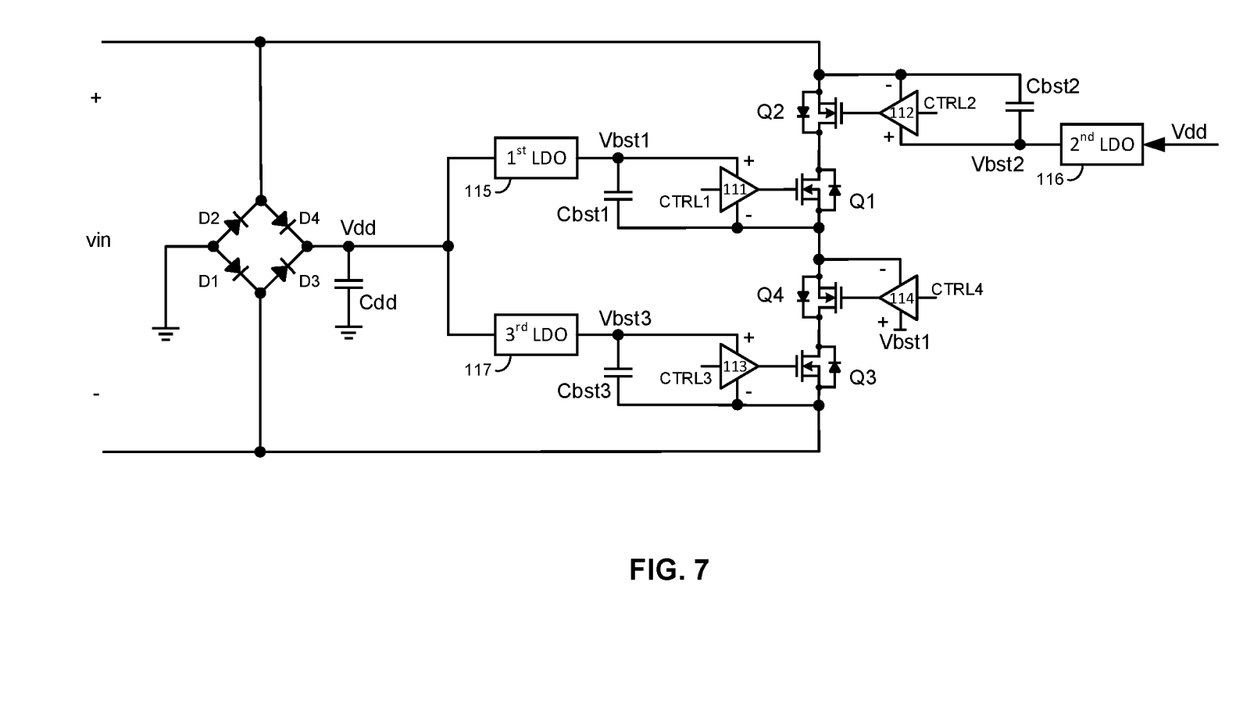
FIG. 7 schematically illustrates a power supply scheme for transistors in direct AC to AC converters, in accordance with an embodiment of the present invention.

To drive the transistors in the modulation stage, a diode bridge, which includes diodes D1~D4 connected as shown in FIG. 7, could be used to convert the AC input voltage Vin into a DC voltage. The cathode of the diode D2 and the anode of the diode D4 are coupled together and coupled to the first terminal of the AC power source. The cathode of the diode D1 and the anode of the diode D3 are coupled together and coupled to the second terminal of the AC power source. The anodes of diodes D1 and D2 are coupled together to form a negative rail of the diode bridge. This negative rail is referred as a reference ground. The cathodes of the diodes D3 and D4 are coupled together to form a positive rail of the diode bridge. This positive rail is used as a power supply voltage Vdd. A capacitor Cdd is normally coupled between the power supply voltage Vdd and the reference ground.

Since the transistors Q1~Q4 are floating during part of or the full cycle of the AC input voltage, bootstrap circuitries supplied by the power supply voltage Vdd could be used to realize gate driving of the transistors. And since the transistors Q1 and Q4 have their source terminals coupled together, they are able to share the same bootstrap circuitry. As shown in FIG. 7, driving circuit 111~114, LDOs (low dropout regulators) 115~117, and bootstrap capacitors Cbst1, Cbst2 and Cbst3 are incorporated to drive the transistors Q1~Q4.

The first LDO 115 has an input terminal and an output terminal, wherein the input terminal is coupled to the diode bridge to receive the power supply voltage Vdd, the output terminal is configured to provide a first bootstrap voltage Vbst1. The first driving circuit 111 has a first supply terminal, a second supply terminal, an input terminal and an output terminal, wherein the first supply terminal is coupled to the output terminal of the first LDO 115 to receive the first bootstrap voltage Vbst1, the second supply terminal is coupled to the source terminal of the transistor Q1, the input terminal is configured to receive a first control signal CTRL1 controlling the transistor Q1, the output terminal is coupled to the gate terminal of the transistor Q1. The first bootstrap capacitor Cbst1 is coupled between the output terminal of the first LDO 115 and the source terminal of the transistor Q1.

The second LDO 116 has an input terminal and an output terminal, wherein the input terminal is coupled to the diode bridge to receive the power supply voltage Vdd, the output terminal is configured to provide a second bootstrap voltage Vbst2. The second driving circuit 112 has a first supply terminal, a second supply terminal, an input terminal and an output terminal, wherein the first supply terminal is coupled to the output terminal of the second LDO 116 to receive the second bootstrap voltage Vbst2, the second supply terminal is coupled to the source terminal of the transistor Q2, the input terminal is configured to receive a second control signal CTRL2 controlling the transistor Q2, the output terminal is coupled to the gate terminal of the transistor Q2. The second bootstrap capacitor Cbst2 is coupled between the output terminal of the second LDO 116 and the source terminal of the transistor Q2.

The third LDO 117 has an input terminal and an output terminal, wherein the input terminal is coupled to the diode bridge to receive the power supply voltage Vdd, the output terminal is configured to provide a third bootstrap voltage Vbst3. The third driving circuit 113 has a first supply terminal, a second supply terminal, an input terminal and an output terminal, wherein the first supply terminal is coupled to the output terminal of the third LDO 117 to receive the third bootstrap voltage Vbst3, the second supply terminal is coupled to the source terminal of the transistor Q3, the input terminal is configured to receive a third control signal CTRL3 controlling the transistor Q3, the output terminal is coupled to the gate terminal of the transistor Q3. The third bootstrap capacitor Cbst3 is coupled between the output terminal of the third LDO 117 and the source terminal of the transistor Q3.

The fourth driving circuit 114 has a first supply terminal, a second supply terminal, an input terminal and an output terminal, wherein the first supply terminal is coupled to the output terminal of the first LDO 115 to receive the first bootstrap voltage Vbst1, the second supply terminal is coupled to the source terminal of the transistor Q4, the input terminal is configured to receive a fourth control signal CTRL4 controlling the transistor Q4, the output terminal is coupled to the gate terminal of the transistor Q4.

In the embodiment shown in FIG. 7, three LDOs 115, 116 and 117 are utilized for respectively generating one of the bootstrap voltages Vbst1, Vbst2 and Vbst3. Alternatively, other embodiments of the present invention could also use one LDO, e.g. LDO 118 as shown in FIG. 8 to generate a voltage Vbst, and then using diodes D5, D6 and D7 to respectively distribute the voltage Vbst to bootstrap capacitors Cbst1, Cbst2 and Cbst3.

Figure 8:
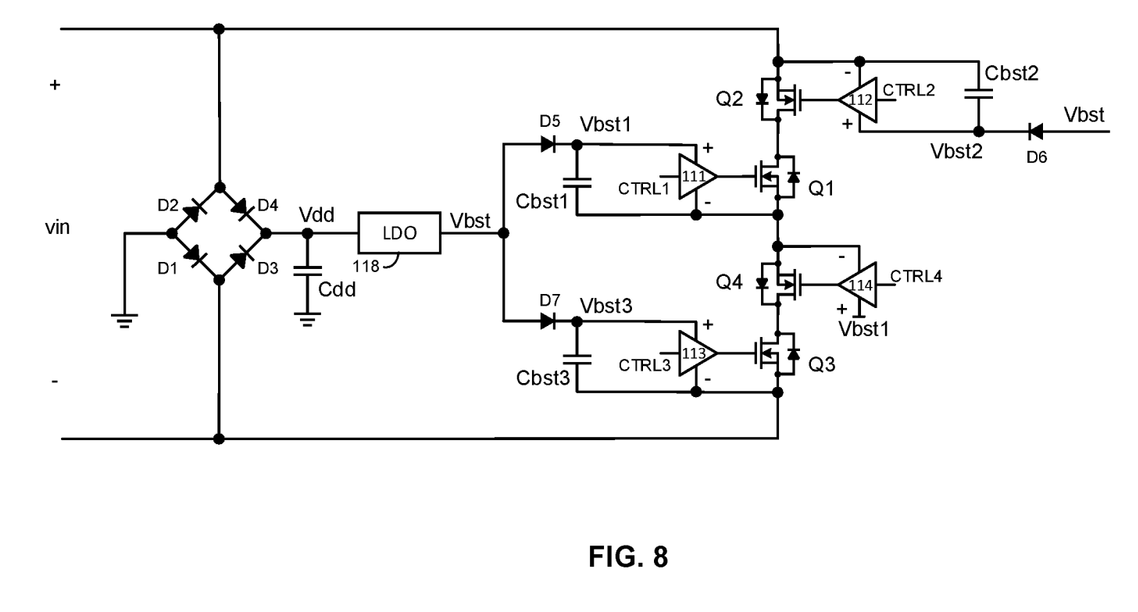
FIG. 8 schematically illustrate a power supply scheme for transistors in direct AC to AC converters, in accordance with another embodiment of the present invention.
Figure 9:
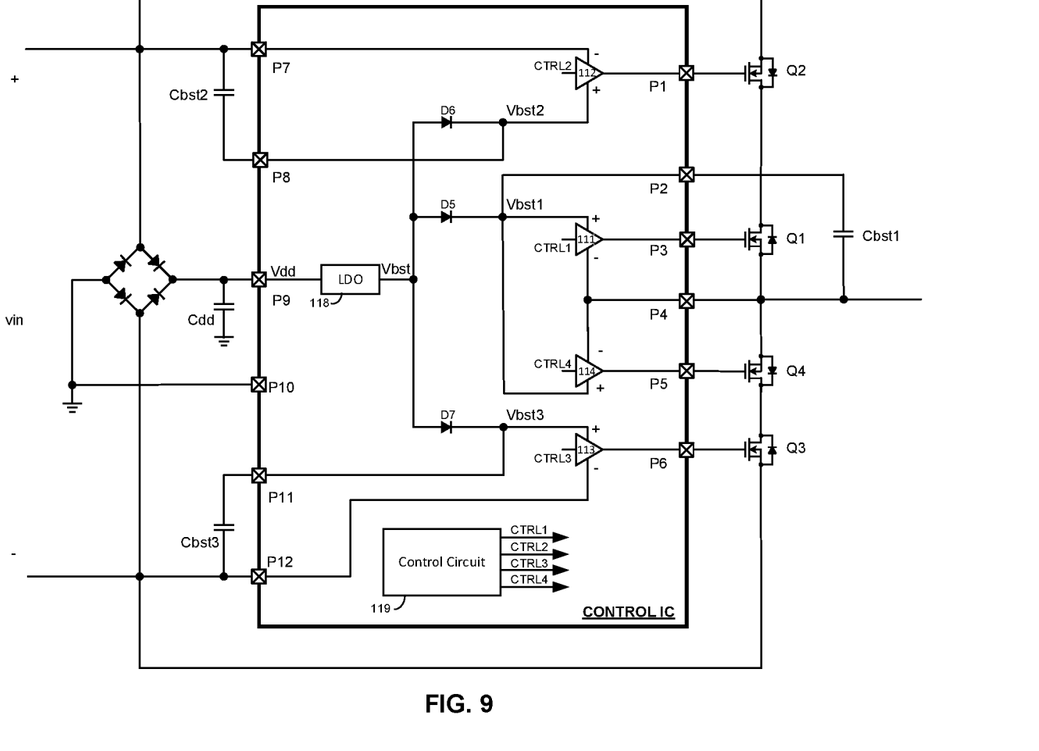
FIG. 9 schematically illustrates a control IC used in direct AC to AC converters, in accordance with an embodiment of the present invention.

FIG. 9 illustrates a control IC used in direct AC to AC converters, in accordance with an embodiment of the present invention. The control IC integrates the driving circuits 111~114, LDO 118 and diodes D5~D7 of FIG. 8, and further includes a control circuit 119 which is configured to generate the control signals CTRL1~CTRL4. The transistors Q1~Q4, capacitors Cdd, Cbst1~Cbst3 and the diode bridge are coupled to the control IC through pins P1~P12, such as shown in FIG. 9.

In one embodiment, when the AC input voltage yin is positive, the control circuit 119 maintains the control signals CTRL2 and CTRL4 as logical high to keep the transistors Q2 and Q4 on, and switches the control signals CTRL1 and CTRL3 alternately between logical high and logical low at the second frequency, e.g. with a duty cycle of substantially 50%. When the AC input voltage yin is negative, the control circuit 119 maintains the control signals CTRL1 and CTRL3 as logical high to keep the transistors Q1 and Q3 on, and switches the control signals CTRL2 and CTRL4 alternately between logical high and logical low at the second frequency, e.g. with a duty cycle of substantially 50%.

The power supply and bootstrap schemes shown in FIGS. 7~9 could also be used for transistors in the de-modulation stage. The AC output voltage vout could be rectified to get the power supply voltage Vdd in steady state, while during start-up the voltage vsec across the secondary winding of the transformer T1 could be used instead to provide the power.

In the embodiments illustrated above, N-type MOSFETs are used to form the back-to-back transistors. MOSFETs have source and drain regions formed within the channel region of a semiconductor substrate, and a gate electrode formed there between. In the case of an N-type MOSFET, the channel region is coupled to the source region. Consequently, a parasitic body diode is formed from the source region and the channel region coupled thereto, to the drain region. That is, in a normal circuit, the current path in the direction from the drain region toward the source region in an N-type MOSFET is turned on and off, but a body diode is continuously formed in the current path from the source region toward the drain region, and current is never shut off. Hence in order to form a bidirectional blocking switch which could perform on/off switching of current in both directions, it is needed to couple two N-type MOSFETs in a back-to-back arrangement.

Figure 10:
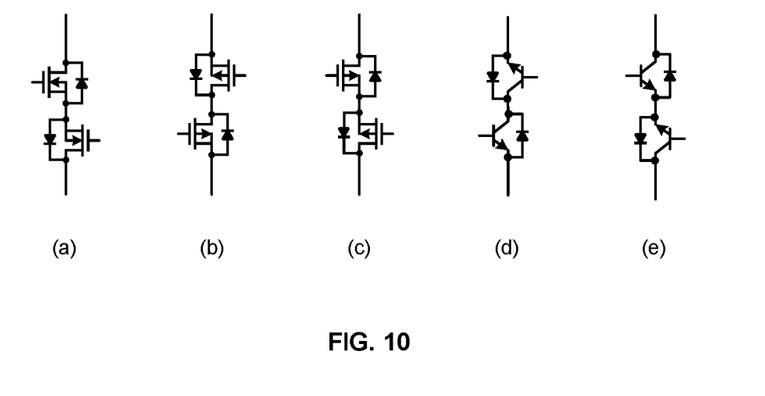
FIG. 10 illustrates alternative structures of the bi-directional blocking switch used in direct AC to AC converters, in accordance with embodiments of the present invention.

Although back-to-back N-type MOSFETs with their drain terminals coupled together are adopted in the embodiments illustrated above, it could be understood that this is not intended to limit the present invention. The back-to-back N-type MOSFETs could also have their source terminals coupled together, and the N-type MOSFETs could be replaced by P-type MOSFETS, as shown in FIGS. 10(a)~10(c). In additional, other controllable devices, such as BJTs (Bipolar Junction Transistors), HEMTs (High Electron Mobility Transistors), IGBTs (Insulated Gate Bipolar Transistors) and GTOs (Gate Turn-off Thyristors), could also be used, as long as a bidirectional blocking switch is created. As can be seen from FIGS. 10(d) and 10(e), when BJTs are used, anti-parallel diodes are further needed so they can carry emitter to collector currents.

Although many detailed circuits are shown in the embodiments above, it is apparent to persons of ordinary skills in the art that, these detailed circuit are only used for illustration purpose only, and are not intended to limit the present invention. Other suitable circuit structure with same or similar function could also be utilized. A duty cycle of 50% is used as an example for controlling the transistors in the direct AC to AC converters. But it should be noted that, duty cycles other than 50% could also be adopted, as long as the duty cycle used in the modulation stage and the de-modulation stage are consistent. And there could always be a dead time intentionally set to prevent shoot-through of the transistors.

Furthermore, the polarity of voltages shown in the figures are used for illustration, and could be adjusted or exchanged based on practical applications. In the circuit configuration shown in FIG. 2, the first terminal of the primary winding and the second terminal of the secondary winding are dotted terminals of the same magnetic polarity. But it is apparent to persons of ordinary skills in the art that, this is not limiting and could be adjusted.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A direct AC to AC converter comprising:
    a modulation stage configured to convert an AC input voltage with a first frequency into a bipolar PWM voltage with a second frequency, wherein the second frequency is higher than the first frequency;
    a transformer having a primary winding and secondary winding, wherein the primary winding is coupled to the modulation stage to receive the bipolar PWM voltage; and
    a de-modulation stage coupled to the secondary winding of the transformer and configured to convert a voltage across the secondary winding of the transformer into an AC output voltage with the first frequency,
    wherein the modulation stage comprises:
        a first transistor having a first terminal, a second terminal and a control terminal;
        a second transistor having a first terminal, a second terminal and a control terminal, wherein the first terminal of the second transistor is coupled to the first terminal of the first transistor, the second terminal of the second transistor is configured to be coupled to a first terminal of an AC power source providing the AC input voltage;
        a third transistor having a first terminal, a second terminal and a control terminal, wherein the second terminal of the third transistor is configured to be coupled to a second terminal of the AC power source;
        a fourth transistor having a first terminal, a second terminal and a control terminal, wherein the first terminal of the fourth transistor is coupled to the first terminal of the third transistor, the second terminal of the fourth transistor and the second terminal of the first transistor are coupled together and coupled to a first terminal of the primary winding of the transformer,
        a diode bridge having a first input terminal, a second input terminal, a first output terminal and a second output terminal, wherein the first input terminal is configured to be coupled to the first terminal of the AC power source, the second input terminal is configured to be coupled to the second terminal of the AC power source, the first output terminal is configured to provide a power supply voltage, the second output terminal is coupled to a reference ground;

a power supply capacitor coupled between the first output terminal of the diode bridge and the reference ground;

a first driving circuit having a first supply terminal, a second supply terminal, an input terminal and an output terminal, wherein the second supply terminal is coupled to the second terminal of the first transistor, the input terminal is configured to receive a first control signal, the output terminal is coupled to the control terminal of the first transistor;

a first bootstrap capacitor coupled between the first and second supply terminals of the first driving circuit;

a second driving circuit having a first supply terminal, a second supply terminal, an input terminal and an output terminal, wherein the second supply terminal is coupled to the second terminal of the second transistor, the input terminal is configured to receive a second control signal, the output terminal is coupled to the control terminal of the second transistor;

a second bootstrap capacitor coupled between the first and second supply terminals of the second driving circuit;

a third driving circuit having a first supply terminal, a second supply terminal, an input terminal and an output terminal, wherein the second supply terminal is coupled to the second terminal of the third transistor, the input terminal is configured to receive a third control signal, the output terminal is coupled to the control terminal of the third transistor;

a third bootstrap capacitor coupled between the first and second supply terminals of the third driving circuit;

a fourth driving circuit having a first supply terminal, a second supply terminal, an input terminal and an output terminal, wherein the first supply terminal is coupled to the first supply terminal of the first driving circuit, the second supply terminal is coupled to the second terminal of the fourth transistor, the input terminal is configured to receive a fourth control signal, the output terminal is coupled to the control terminal of the fourth transistor a first low dropout regulator having an input terminal and an output terminal, wherein the input terminal of the first low dropout regulator is coupled to the first output terminal of the diode bridge to receive the power supply voltage, the output terminal of the first low dropout regulator is coupled to the first supply terminal of the first driving circuit;

a second low dropout regulator having an input terminal and an output terminal, wherein the input terminal of the second low dropout regulator is coupled to the first output terminal of the diode bridge to receive the power supply voltage, the output terminal of the second low dropout regulator is coupled to the first supply terminal of the second driving circuit; and a third low dropout regulator having an input terminal and an output terminal, wherein the input terminal of the third low dropout regulator is coupled to the first output terminal of the diode bridge to receive the power supply voltage, the output terminal of the third low dropout regulator is coupled to the first supply terminal of the third driving circuit.

2. The direct AC to AC converter of claim 1, wherein the modulation stage further comprises:

a first capacitor having a first terminal and a second terminal, wherein the first terminal is coupled to the second terminal of the second transistor; and a second capacitor having a first terminal and a second terminal, wherein the first terminal of the second capacitor and the second terminal of the first capacitor are coupled together and coupled to a second terminal of the primary winding of the transformer, the second terminal of the second capacitor is coupled to the second terminal of the third transistor.

3. The direct AC to AC converter of claim 1, wherein:

when the AC input voltage is in a first half cycle, the second and fourth transistors are maintained on, the first and third transistors are switched at the second frequency; and when the AC input voltage is in a second half cycle, the first and third transistors are maintained on, the second and fourth transistors are switched at the second frequency.

4. The direct AC to AC converter of claim 1, wherein the de-modulation stage comprises:

a fifth transistor having a first terminal, a second terminal and a control terminal;

a sixth transistor having a first terminal, a second terminal and a control terminal, wherein the first terminal of the sixth transistor is coupled to the first terminal of the fifth transistor, the second terminal of the sixth transistor is configured to be coupled to a first terminal of a load for providing the AC output voltage;

a seventh transistor having a first terminal, a second terminal and a control terminal, wherein the second terminal of the seventh transistor is configured to be coupled to a second terminal of the load; and an eighth transistor having a first terminal, a second terminal and a control terminal, wherein the first terminal of the eighth transistor is coupled to the first terminal of the seventh transistor, the second terminal of the eighth transistor and the second terminal of the fifth transistor are coupled together and coupled to a first terminal of the secondary winding of the transformer.

5. The direct AC to AC converter of claim 4, wherein the de-modulation stage further comprises:

a third capacitor having a first terminal and a second terminal, wherein the first terminal is coupled to the second terminal of the sixth transistor; and a fourth capacitor having a first terminal and a second terminal, wherein the first terminal of the fourth capacitor and the second terminal of the third capacitor are coupled together and coupled to a second terminal of the secondary winding of the transformer, the second terminal of the fourth capacitor is coupled to the second terminal of the seventh transistor.

6. The direct AC to AC converter of claim 4, wherein:

when the AC input voltage is in a first half cycle, the sixth and eighth transistors are maintained on, the fifth and seventh transistors work as synchronous rectifiers to rectify the voltage across the secondary winding of the transformer; and when the AC input voltage is in a second half cycle, the fifth and seventh transistors are maintained on, the sixth and eighth transistors work as synchronous rectifiers to rectify the voltage across the secondary winding of the transformer.

7. The direct AC to AC converter of claim 4, wherein the de-modulation stage further comprises:

a thirteenth transistor having a first terminal, a second terminal and a control terminal;

a fourteenth transistor having a first terminal, a second terminal and a control terminal, wherein the first terminal of the fourteenth transistor is coupled to the first terminal of the thirteenth transistor, the second terminal of the fourteenth transistor is coupled to the second terminal of the sixth transistor;
a fifteenth transistor having a first terminal, a second terminal and a control terminal, wherein the second terminal of the fifteenth transistor is coupled to the second terminal of the seventh transistor; and
an sixteenth transistor having a first terminal, a second terminal and a control terminal, wherein the first terminal of the sixteenth transistor is coupled to the first terminal of the fifteenth transistor, the second terminal of the sixteenth transistor and the second terminal of the thirteenth transistor are coupled together and coupled to a second terminal of the secondary winding of the transformer.

8. The direct AC to AC converter of claim 4, wherein the de-modulation stage further comprises:
a sixth capacitor having a first terminal and a second terminal, wherein the first terminal of the sixth capacitor is coupled to a second terminal of the secondary winding of the transformer, the second terminal of the sixth capacitor is coupled to the second terminal of the seventh transistor.

9. The direct AC to AC converter of claim 1, wherein the modulation stage further comprises:
a ninth transistor having a first terminal, a second terminal and a control terminal;
a tenth transistor having a first terminal, a second terminal and a control terminal, wherein the first terminal of the tenth transistor is coupled to first terminal of the ninth transistor, the second terminal of the tenth transistor is coupled to the second terminal of the second transistor;
an eleventh transistor having a first terminal, a second terminal and a control terminal, wherein the second terminal of the eleventh transistor is coupled to the second terminal of the third transistor; and
a twelfth transistor having a first terminal, a second terminal and a control terminal, wherein the first terminal of the twelfth transistor is coupled to the first terminal of the eleventh transistor, the second terminal of the twelfth transistor and the second terminal of the ninth transistor are coupled together and coupled to a second terminal of the primary winding of the transformer.

10. The direct AC to AC converter of claim 1, wherein the modulation stage further comprises:
a fifth capacitor having a first terminal and a second terminal, wherein the first terminal of the fifth capacitor is coupled to a second terminal of the primary winding of the transformer, the second terminal of the fifth capacitor is coupled to the second terminal of the third transistor.

11. A control IC used in a direct AC to AC converter, wherein the direct AC to AC converter is configured to convert an AC input voltage of a first frequency into an AC output voltage of the first frequency, and comprises a first transistor, a second transistor, a third transistor and a fourth transistor, wherein each of the first to fourth transistors have a first terminal, a second terminal and a control terminal, the first terminal of the second transistor is coupled to the first terminal of the first transistor, the first terminal of the fourth transistor is coupled to the first terminal of the third transistor, the second terminal of the fourth transistor is coupled to the second terminal of the first transistor, wherein:
when the AC input voltage is in a first half cycle, the control IC maintains the second and fourth transistors on, and switches the first and third transistors at a second frequency higher than the first frequency; and
when the AC input voltage is in a second half cycle, the control IC maintains the first and third transistors on, and switches the second and fourth transistors at the second frequency,
the control IC comprises:
a control circuit configured to generate a first control signal, a second control signal, a third control signal and a fourth control signal;
a first driving circuit having a first supply terminal, a second supply terminal, an input terminal and an output terminal, wherein the first supply terminal is coupled to a first terminal of a first bootstrap capacitor, the second supply terminal is coupled to the second terminal of the first transistor and a second terminal of the first bootstrap capacitor, the input terminal is coupled to the control circuit to receive the first control signal, the output terminal is coupled to the control terminal of the first transistor;
a second driving circuit having a first supply terminal, a second supply terminal, an input terminal and an output terminal, wherein the first supply terminal is coupled to a first terminal of a second bootstrap capacitor, the second supply terminal is coupled to the second terminal of the second transistor and a second terminal of the second bootstrap capacitor, the input terminal is coupled to the control circuit to receive the second control signal, the output terminal is coupled to the control terminal of the second transistor;
a third driving circuit having a first supply terminal, a second supply terminal, an input terminal and an output terminal, wherein the first supply terminal is coupled to a first terminal of a third bootstrap capacitor, the second supply terminal is coupled to the second terminal of the third transistor and a second terminal of the third bootstrap capacitor, the input terminal is coupled to the control circuit to receive the third control signal, the output terminal is coupled to the control terminal of the third transistor;
a fourth driving circuit having a first supply terminal, a second supply terminal, an input terminal and an output terminal, wherein the first supply terminal is coupled to the first supply terminal of the first driving circuit, the second supply terminal is coupled to the second terminal of the fourth transistor, the input terminal is coupled to the control circuit to receive the fourth control signal, the output terminal is coupled to the control terminal of the fourth transistor;
a first low dropout regulator having an input terminal and an output terminal, wherein the input terminal of the first low dropout regulator is configured to receive a power supply voltage, the output terminal of the first low dropout regulator is coupled to the first supply terminal of the first driving circuit;
a second low dropout regulator having an input terminal and an output terminal, wherein the input terminal of the second low dropout regulator is configured to receive the power supply voltage, the output terminal of the second low dropout regulator is coupled to the first supply terminal of the second driving circuit; and
a third low dropout regulator having an input terminal and an output terminal, wherein the input terminal of the third low dropout regulator is configured to receive the power supply voltage, the output terminal of the third low dropout regulator is coupled to the first supply terminal of the third driving circuit.

12. The control IC of claim 11, wherein the second terminal of the second transistor is configured to be coupled to a first terminal of an AC power source providing the AC input voltage, the second terminal of the third transistor is configured to be coupled to a second terminal of the AC power source.

13. The control IC of claim 11, further configured to receive the power supply voltage from a diode bridge, wherein the diode bridge has a first input terminal, a second input terminal, a first output terminal and a second output terminal, the first input terminal is coupled to the second terminal of the second transistor, the second input terminal is coupled to the second terminal of the third transistor, the first output terminal is coupled to a first terminal of a power supply capacitor and configured to provide the power supply voltage to the control IC, the first second output terminal is coupled to a second terminal of the power supply capacitor and a reference ground of the control IC.

14. A control IC used in a direct AC to AC converter, wherein the direct AC to AC converter is configured to convert an AC input voltage into an AC output voltage, and comprises a first transistor, a second transistor, a third transistor and a fourth transistor, each transistor has a first terminal, a second terminal and a control terminal, the control IC comprises:
- a first pin configured to be coupled to the control terminal of the second transistor;
- a second pin configured to be coupled to a first terminal of a first bootstrap capacitor;
- a third pin configured to be coupled to the control terminal of the first transistor;
- a fourth pin configured to be coupled to the second terminals of the first and fourth transistors, and a second terminal of the first bootstrap capacitor;
- a fifth pin configured to be coupled to the control terminal of the fourth transistor;
- a sixth pin configured to be coupled to the control terminal of the third transistor;
- a seventh pin configured to be coupled to the second terminal of the second transistor and a second terminal of a second bootstrap capacitor;
- an eighth pin configured to be coupled to a first terminal of the second bootstrap capacitor;
- a ninth pin configured to receive a power supply voltage;
- a tenth pin configured to be coupled to a reference ground;
- an eleventh pin configured to be coupled to a first terminal of a third bootstrap capacitor;
- a twelfth pin configured to be coupled to the second terminal of the third transistor and a second terminal of the third bootstrap capacitor;
- a control circuit configured to generate a first control signal, a second control signal, a third control signal and a fourth control signal;
- a low dropout regulator having an input terminal and an output terminal, wherein the input terminal is coupled to the ninth pin to receive the power supply voltage;
- a first diode having an anode and a cathode, wherein the anode is coupled to the output terminal of the low dropout regulator;
- a first driving circuit having a first supply terminal, a second supply terminal, an input terminal and an output terminal, wherein the first supply terminal is coupled to the cathode of the first diode, the second supply terminal is coupled to the fourth pin, the input terminal is coupled to the control circuit to receive the first control signal, the output terminal is coupled to the third pin;
- a second diode having an anode and a cathode, wherein the anode is coupled to the output terminal of the low dropout regulator;
- a second driving circuit having a first supply terminal, a second supply terminal, an input terminal and an output terminal, wherein the first supply terminal is coupled to the cathode of the second diode, the second supply terminal is coupled to the seventh pin, the input terminal is coupled to the control circuit to receive the second control signal, the output terminal is coupled to the first pin;
- a third diode having an anode and a cathode, wherein the anode is coupled to the output terminal of the low dropout regulator;
- a third driving circuit having a first supply terminal, a second supply terminal, an input terminal and an output terminal, wherein the first supply terminal is coupled to the cathode of the third diode, the second supply terminal is coupled to the twelfth pin, the input terminal is coupled to the control circuit to receive the third control signal, the output terminal is coupled to the sixth pin; and
- a fourth driving circuit having a first supply terminal, a second supply terminal, an input terminal and an output terminal, wherein the first supply terminal is coupled to the cathode of the first diode, the second supply terminal is coupled to the fourth pin, the input terminal is coupled to the control circuit to receive the fourth control signal, the output terminal is coupled to the fifth pin.

15. The control IC of claim 14, wherein:
when the AC input voltage is in a first half cycle, the second and fourth transistors are maintained on, the first and third transistors are switched at a second frequency higher than a first frequency of the AC input voltage; and
when the AC input voltage is in a second half cycle, the first and third transistors are maintained on, the second and fourth transistors are switched at the second frequency.

* * * * *